(12) United States Patent
Peurach et al.

(10) Patent No.: US 7,191,191 B2
(45) Date of Patent: *Mar. 13, 2007

(54) HAPTIC AUTHORING

(75) Inventors: Thomas M. Peurach, Novi, MI (US);
Todd Yocum, Ann Arbor, MI (US);
Douglas Haanpaa, Ann Arbor, MI (US)

(73) Assignee: Immersion Corporation, San Jose, CA (US)

( * ) Notice: Subject to any disclaimer, the term of this patent is extended or adjusted under 35 U.S.C. 154(b) by 1056 days.

This patent is subject to a terminal disclaimer.

(21) Appl. No.: 10/122,090

(22) Filed: Apr. 12, 2002

(65) Prior Publication Data

US 2002/0109708 A1    Aug. 15, 2002

Related U.S. Application Data

(63) Continuation of application No. 09/640,358, filed on Aug. 16, 2000, now Pat. No. 6,374,255, which is a continuation of application No. 08/859,877, filed on May 21, 1997, now Pat. No. 6,131,097.

(60) Provisional application No. 60/018,037, filed on May 21, 1996.

(51) Int. Cl.
G06F 17/30 (2006.01)

(52) U.S. Cl. .................. 707/104.1; 707/100; 707/101; 707/102

(58) Field of Classification Search ................ 707/102, 707/100, 101, 104.1; 345/706
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 3,919,691 A | 11/1975 | Noll | |

(Continued)

FOREIGN PATENT DOCUMENTS

EP    0349086    1/1990

(Continued)

OTHER PUBLICATIONS

Baigrie, "Electric Control Loading—A Low Cost, High Performance Alternative," Proceedings, pp. 247-254, Nov. 6-8, 1990.

(Continued)

*Primary Examiner*—Apu Mofiz
*Assistant Examiner*—Farhan M. Syed
(74) *Attorney, Agent, or Firm*—Kilpatrick Stockton LLP

(57) ABSTRACT

Methods are presented for authoring geometrical databases which incorporate touch or haptic feedback. In particular, a database of geometrical elements incorporates attributes necessary to support haptic interactions such as stiffness, hardness, friction, and so forth. Users may instantiate objects designed through CAD/CAM environments or attach haptic or touch attributes to subcomponents such as surfaces or solid sub-objects. The resulting haptic/visual databases or world-describing models can then be viewed and touched using a haptic browser or other appropriate user interface.

11 Claims, 9 Drawing Sheets

U.S. PATENT DOCUMENTS

| | | |
|---|---|---|
| 4,160,508 A | 7/1979 | Salsbury |
| 4,236,325 A | 12/1980 | Hall et al. |
| 4,513,235 A | 4/1985 | Acklam et al. |
| 4,581,491 A | 4/1986 | Boothroyd |
| 4,599,070 A | 7/1986 | Hladky et al. |
| 4,604,016 A | 8/1986 | Joyce |
| 4,708,656 A | 11/1987 | De Vries et al. |
| 4,713,007 A | 12/1987 | Alban |
| 4,795,296 A | 1/1989 | Jau |
| 4,868,549 A | 9/1989 | Affiito et al. |
| 4,891,764 A | 1/1990 | McIntosh |
| 4,930,770 A | 6/1990 | Baker |
| 4,934,694 A | 6/1990 | McIntosh |
| 4,982,918 A | 1/1991 | Kaye |
| 5,004,391 A | 4/1991 | Burdea |
| 5,007,300 A | 4/1991 | Siva |
| 5,018,922 A | 5/1991 | Yoshinada et al. |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,062,594 A | 11/1991 | Repperger |
| 5,078,152 A | 1/1992 | Bond |
| 5,103,404 A | 4/1992 | McIntosh |
| 5,116,180 A | 5/1992 | Fung et al. |
| 5,142,931 A | 9/1992 | Menahem |
| 5,143,505 A | 9/1992 | Burdea et al. |
| 5,146,566 A | 9/1992 | Hollis, Jr. |
| 5,165,897 A * | 11/1992 | Johnson ............... 434/113 |
| 5,180,351 A | 1/1993 | Ehrenfried |
| 5,185,561 A | 2/1993 | Good et al. |
| 5,186,629 A | 2/1993 | Rohen |
| 5,186,695 A | 2/1993 | Mangseth et al. |
| 5,212,473 A | 5/1993 | Louis |
| 5,220,260 A | 6/1993 | Schuler |
| 5,223,776 A | 6/1993 | Radke et al. |
| 5,240,417 A | 8/1993 | Smithson et al. |
| 5,264,768 A | 11/1993 | Gregory et al. |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,382,885 A | 1/1995 | Salcudean et al. |
| 5,389,865 A | 2/1995 | Jacobus et al. |
| 5,405,152 A | 4/1995 | Katanics et al. |
| 5,451,924 A | 9/1995 | Massimino et al. |
| 5,459,382 A | 10/1995 | Jacobus et al. |
| 5,466,213 A | 11/1995 | Hogan |
| 5,482,051 A | 1/1996 | Reddy et al. |
| 5,506,605 A | 4/1996 | Paley |
| 5,512,919 A | 4/1996 | Araki |
| 5,513,100 A | 4/1996 | Parker et al. |
| 5,547,382 A | 8/1996 | Yamasaki |
| 5,548,694 A * | 8/1996 | Frisken Gibson ........... 345/424 |
| 5,562,572 A | 10/1996 | Carmein |
| 5,576,727 A | 11/1996 | Rosenberg et al. |
| 5,583,478 A | 12/1996 | Renzi |
| 5,587,937 A | 12/1996 | Massie et al. |
| 5,588,139 A | 12/1996 | Lanier et al. |
| 5,589,828 A | 12/1996 | Armstrong |
| 5,589,854 A | 12/1996 | Tsai |
| 5,619,180 A | 4/1997 | Massimino et al. |
| 5,623,582 A | 4/1997 | Rosenberg |
| 5,623,642 A | 4/1997 | Katz et al. |
| 5,625,576 A | 4/1997 | Massie et al. |
| 5,629,594 A * | 5/1997 | Jacobus et al. ........ 318/568.11 |
| 5,666,138 A | 9/1997 | Culver |
| 5,666,473 A | 9/1997 | Wallace |
| 5,691,898 A | 11/1997 | Rosenberg |
| 5,709,219 A | 1/1998 | Chen et al. |
| 5,714,978 A | 2/1998 | Yamanaka et al. |
| 5,721,566 A | 2/1998 | Rosenberg et al. |
| 5,729,249 A | 3/1998 | Yasutake |
| 5,734,373 A | 3/1998 | Rosenberg et al. |
| 5,736,982 A * | 4/1998 | Suzuki et al. ............... 345/706 |
| 5,742,278 A | 4/1998 | Chen et al. |
| 5,755,577 A | 5/1998 | Gillio |
| 5,766,016 A | 6/1998 | Sinclair |
| 5,767,836 A | 6/1998 | Rosenberg |
| 5,769,640 A | 6/1998 | Jacobus et al. |
| 5,781,172 A | 7/1998 | Engel et al. |
| 5,785,630 A | 7/1998 | Bobick et al. |
| 5,790,108 A | 8/1998 | Salcudean et al. |
| 5,802,353 A | 9/1998 | Avila et al. |
| 5,805,140 A | 9/1998 | Rosenberg et al. |
| 5,825,308 A | 10/1998 | Rosenberg |
| 5,844,392 A | 12/1998 | Peurach et al. |
| 5,884,029 A | 3/1999 | Brush, II et al. |
| 5,889,670 A | 3/1999 | Schuler et al. |
| 5,897,437 A | 4/1999 | Nishiumi et al. |
| 5,923,318 A * | 7/1999 | Zhai et al. .................. 345/157 |
| 5,959,613 A | 9/1999 | Rosenberg et al. |
| 5,973,689 A | 10/1999 | Gallery |
| 5,990,869 A | 11/1999 | Kubica et al. |
| 6,004,134 A | 12/1999 | Marcus et al. |
| 6,028,593 A | 2/2000 | Rosenberg et al. |
| 6,046,726 A | 4/2000 | Keyson |
| 6,088,017 A | 7/2000 | Tremblay et al. |
| 6,104,158 A | 8/2000 | Jacobus et al. |
| 6,111,577 A | 8/2000 | Zilles et al. |
| 6,131,097 A | 10/2000 | Peurach et al. |
| 6,147,674 A | 11/2000 | Rosenberg et al. |
| 6,161,126 A | 12/2000 | Wies et al. |
| 6,169,540 B1 | 1/2001 | Rosenberg et al. |
| 6,219,034 B1 | 4/2001 | Elbing et al. |
| 6,422,941 B1 | 7/2002 | Thorner et al. |
| 6,711,418 B1 * | 3/2004 | Wang et al. .............. 455/553.1 |

FOREIGN PATENT DOCUMENTS

| | | |
|---|---|---|
| JP | 01-003664 | 7/1990 |
| JP | 02-109714 | 1/1992 |
| JP | 04-007371 | 8/1993 |
| JP | 05-193862 | 1/1995 |
| WO | WO 9520788 | 3/1995 |
| WO | WO 97/21160 | 12/1997 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking, " Order No. 9034744, p. 1-369, 1990.

Tadros, "Control System Design for a Three Degree of Freedom Virtual Environment Simulator Using Motor/Brake Pair Actuators," MIT Archive © Massachusetts Institute of Technology, pp. 1-68, Feb. 1990.

Caldwell et al., "Enhanced Tactile Feedback (Tele-Taction) Using a Multi-Functional Sensory System," 1050-4729/93, pp. 955-960. 1993.

Adelstein, "Design and Implementation of a Force Reflecting Manipulandum for Manual Control research," DSC- vol. 42, Advances in Robotics, Edited by H. Kazerooni, pp. 1-12. 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DCS-vol. 42, Advances in Robotics, pp. 55-61, ASME 1992.

Russo, "Controlling Dissipative Magnetic Particle Brakes in Force Reflective Devices," DSV-vol. 42, Advances in Robotics, pp. 63-70, ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," Cooperative Intelligent Robotics in Space, Rul J. deFigueiredo et al., Editor, Proc. SPIE vol. 1387, pp. 215-222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

Mcaffee, "Teleoperator Subsystem/Telerobot Demonsdtrator: Force Reflecting Hand Controller Equipment Manual," JPL D-5172, pp. 1- 50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Jacobsen et al., "High Performance, Dextrous Telerobotic Manipulator WIth Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," Proceedings of Fouteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and deaf-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contactor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug, 12-15, 1980.

Bejczy et al., "A Laboratory Breadboard System For Dual-Arm Teleoperation," SOAR '89 Workshop, JSC, Houston, TX, Jul. 25-27, 1989.

Ouh-Young, "A Low-Cost Force Feedback Joystick and Its Use in PC Video Games," IEEE Transactions on Consumer Electronics, vol. 41, No. 3, Aug. 1995.

Marcus, Touch Feedback in Surgery, Proceedings of Virtual Reality and Medicine The Cutting Edge, Sep. 8-11, 1994.

Bejczy, et al., "Universal Computer Control System (UCCS) For Space Telerobots," CH2413-3/87/0000/318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," Logitech Cyberman SWIFT Supplement, Apr. 5, 1994.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Kaczmarek et al., "Tactile Displays," Virtual Environment Technologies.

Scannell, "Taking a Joystick Ride," Computer Currents, Boston Edition, vol. 9, No. 11, Nov. 1994.

Fletcher, L.A., and Kasturi, R.; A Robust Algorithm for Text String Separation from Mixed Text/Graphic Imag-es. IEEE Transactions on Pattern Analysis and Machine Intelligence, vol. 10, No. 6, Nov. 1988; pp. 910-918.

Cavnar, W.B., Vayda, A.J., "Using Superimposed Coding of N-Gram Lists for Efficient Inexact Matching". Procceedings of the Fifth Advanced Technology Conference, Washington D. C., Nov. 1992, pp. 253-267.

Iwaki, O., Kida, H., and Arakawa, H.; A Segementation Method Based on Office Document Hierarchical Struc-ture. Proceedings of the IEEE International Conference on Systems, Man, and Cybernetics; Oct. 1987; pp. 759-763.

Fisher, J.L., Hinds, S.C., D'Amato, D.P.; A Rule-Based Sys-tem for Document Image Segmentation. Proceedings of the IEEE 10th International Conference on Pattern Rec-ognition, Jun. 1990; pp. 567-572.

Wong, K.Y., Casey, R.G., and Wahl, F.M.; Document Analy-sis System. IBM Journal of Research and Development, vol. 26, No. 6, 1982; pp. 647-656.

Lu, C.; Publish It Electronically. Byte Magazine, Sep. 1993; pp. 95-109.

Zlatopolsky, A.A.; Automated Document Segmentation. Pattern Recognition Letters, vol. 15, Jul. 1994; pp. 699-704.

Mantelman, L.; Voting OCR: Three (or More) Engines Are Better Than One. Imaging Magazine, vol. 3, No. 12, Dec. 1994; pp. 28-32.

Wayner, P.; Optimal Character Recognition. Byte Maga-zine, Dec. 1993; pp. 203-210.

UNLV/Information Science Research Institute, 1994 An-nual Report, University of Nevada, Las Vegas, Apr. 1994.

van der Merwe, N.; The Integration of Document Image Processing and Text Retrieval Principles. The Electron-ic Library, vol. 11, No. 4/5, Aug./Oct. 1993: pp. 273-278.

Nartker, T.A. Rice, S.V., and Kanai, J.; OCR Accuracy; UN-LV's Second Annual Test. Inform Magazine, Jan. 1994; pp. 40-45.

Nartker, T.A. and Rice, S.V.; OCR Accuracy, UNLV's Third Annual Test. Inform Magazine, Sep. 1994; pp. 30-36.

Wahl, F.M., Wong, K.Y., and Casey, R.G.; Block Segmenta-tion and Text Extraction in Mixed Text/Image Docu-ments. Computer Vision, Graphics and Image Process-ing, vol. 20, 1982; pp. 375-390.

Wang, D. and Srihari, S.N.; Classification of Newspaper Image Blocks Using Texture Analysis. Computer Vi-sion, Graphics and Image Processing, vol. 47, 1989; pp. 327-352.

O'Gorman, L.; The Document Spectrum for Page Layout Analysis. IEEE Transactions on Pattern Analysis and Machine Intelligence, vol. 15, No. 11, Nov. 1993; pp. 1162-1173.

Pavlidis, T., and Zhou, J.; Page Segmentation and Classifi-cation. CVGIP: Graphical Models and Image Processing, vol. 54, No. 6, Nov. 1992; pp. 484-496.

Saitoh, T., and Pavlidis, T.; Page Segmentation Without Rect-angle Assumption. Proceedings IEEE 11th Internation-al Conference on Pattern Recognition, Sep. 1992; pp. 277-280.
Perry, A. and Lowe, D.G.; Segmentation of Textured Imag-es. Proceedings of the IEEE Computer Society Confer-ence on Computer Vision and Pattern Recognition, 1989; pp. 326-332.
Shih, F.Y., Chen, S., Hung, D.C.D., Ng. P.A.; A Document Segmentation, Classification and Recognition System. Proceedings IEEE of the Second International Confer-ence on Systems Integration-ICSI, 1992; pp. 258-267.
Saitoh, T., Yamaai, T., and Tachikawa, M.; Document Im-age Segmentation and Layout Analysis. IEICE Transac-tions on Information and Systems, vol. E77-D, No. 7, Jul. 1994; pp. 778-784.
Ouh-young, Ming et al., "Using a Manipulator for Force Display in Molecular Docking", IEEE 1988, pp. 1824-1829.
Iwata, Hiroo et al., "Volume Haptization", IEEE 1993, pp. 16-18.
Arps, R. B., and Truong, T.K.; Comparison of Internation-al Standards for Lossless Still Image Compression. Pro-ceedings of the IEEE, vol. 82, No. 6, Jun. 1994, pp. 889-899.
Baird, H.S., Jones, S.E., Fortune, S.J.; Image Segmentation by Shape-Directed Covers. Proc. of the IEEE 10th International Conference on Pattern Recognition, Jun. 1990; pp. 567-572.
Heid, J.; Page to Pixel. MacWorld, Jul. 1992; pp. 174-181.
Clark, M. amd Bovik, A.C..; Experiments in Segmenting Text on Patterns Using Localized Spatial Filters. Pat-tern Recognition, vol. 22, No. 6, 1989; pp. 707-717.
Jain, Anil K. and Bhattacharjee, Sushil; Text Segmenta-tion Using Gabor Filters for Automatic Document Pro-cessing. Machine Vision and Applications, vol. 5, 1992; pp. 169-184.
Diehl, S. and Eglowstein, H. Tame the Paper Tiger. Byte Magazine, Apr. 1991; pp. 220-238.
Hampel, H., et al.; Technical features of the JBIG standard for progressive bi-level image compression. Signal Processing: Image Communication, vol. 4,No. 2, Apr. 1992, pp. 103-111.
Farrokhnia, F. and Jain, A.K.; A Multi-Channel Filtering Approach to Texture Segmentation. Proc. of the IEEE Computer Vision and Pattern Recognition Conference, 1991; pp. 364-370.
Adachi, Y., "Touch & Trace on the Free-Form Surface of Virtual Object", Proceedings of IEEE Virtual Reality An-nual International Symposium (Sep. 18-22, 1993, Seattle WA) pp. 162-168.
Adlestein, Bernard D. et al., "Design & Implementation of a Force Reflecting manipulandum for Manual Control Re-search". 1992, pp. 1-24.
Bejczy, Antal K.; "The Phantom Robot: Predictive Dis-plays for Teleoperation with Time Delay", IEEE 1990, pp. 546-550.
Iwata, Hiroo, "Pen-Based Haptic Virtual Environment" Proc. of IEEE Virtual Reality Annual International Symposium, 1993.
Kotoku, Tetsue et al., "Environment Modeling for the In-teractive Display (EMID) Used in Telerobotic Systems", IEEE Nov. 3-5, 1991, pp. 999-1004.
Burdea, Grigore et al., "Dextrous Telerobotics with Force Feedback-An Overview", Robotica 1991, vol. 9.Hannaford, Blake et al., "Performance Evaluation of a Six-Axis Generalized Force-Reflecting Teleoperator", IEEE May/Jun. 1991, vol. 21, Nov. 3, pp. 620-633.
Fischer, Patrick et al., "Specification and Design of Input Devices for Teleoperation", 1990.
Colgate, J. Edward et al., "Implementation of Stiff Virtual Walls in Force-Reflecting Interfaces", Sep. 22, 1993, pp. 1-9.
Tan, Hong Z., et al., "Human Factors for the Design of Force-Reflecting Haptic Interfaces," Tan, Srinvasan, Eberman, & Chang, ASME WAM 1994, pp. 1-11.
Buttolo, Pietro et al., "Pen-Based Force Display for Preci-sion Manipulation in Virtual Environments", IEEE, Mar. 1995, pp. 1-8.
Kim, Won S. et al., "Graphics Displays for Operator Aid in Telemanipulation", IEEE 1991, pp. 1059-1067.
Rosenberg. Louis B., "Perceptual Design of a Virtual Rig-id Surface Contact," Center for Design Research, Stan-ford U., Armstrong Lab., AL/CF-TR-1995-0029, Apr. 1993.
Ouh-young, Ming et al., "Force Display Performs Better than Visual Display in a Simple 6-D Docking Task", IEEE 1989, pp. 1462-1466.
Rosenberg, Loius B. et al., "Perceptual Decomposition of Virtual Haptic Surfaces," IEEE, Oct. 1993.
Pavlidis, T., and Zhou, J.; Page Segmentation and Classifi-cation. CVGIP: Graphical Models and Image Processing, vol. 54, No. 6, Nov. 1992; pp. 484-496.
Saitoh, T., Pavlidis, T.; Page Segmentation Without Rect-angle Assumption. Proceedings IEEE 11th Conference on Pattern Recognition, Sep. 1992; pp. 277-280.
Perry, A. and Lowe, D.G.; Segmentation of Textured Imag-es. Proceedings of the IEEE Computer Society Confer-ence on Computer Vision and Pattern Recognition, 1989; pp. 326-332.
Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.
Kelley, A. J. et al., "On the Development of a Force-Feedback Mouse and its Integration into a Graphical User Interface," 1994.
Schmult, Brian et al., "Application Areas for a Force-Feedback Joystick," ASME 1993, DSC-vol. 49, pp. 47-54.
Minsky, Margaret et al., "Feeling and Seeing: Issues in Force Display," ACM 1990, pp. 235-242.
Russo, Massimo Andrea, "The Design and Implementation of a Three Degree-of-Freedom Force Output Joystick," Department of Mechanical Engineering, May 11, 1990, pp. 9-40 & 96 & 97.
Rosenberg, L., A Force Feedback Programming Primer, Immersio Corp., 1997.
Payette, J., "Evaluation of a Force Feedback (Haptic) Computer Pointing Device in Zero Gravity," ASME 1996, pp. 547-553.
Hannaford, B. et al., "Force-Feedback Cursor Control," NASA Tech Brief, vol. 13, No. 11, Item No. 21, Nov. 1989.
Ramstein, C. et al., "The Pantograph: A Large Workspace Haptic Device for a Multimodal Human-Computer Interaction," CHI, 1994.
Yokokohji, Y. et al., "What You Can See is What You Can Feel—Development of a Visual/Haptic Interface to Virtual Envi-ronment," IEEE 0-8186-7295-1, 1996, pp. 46-54.
Rosenberg, Louis B., "The Use of Force Feedback to Enhance Graphical User Interfaces", Proc. SPIE 2653, Vol. 19, pp. 243-248.
Iwata, Hiroo, "Artificial Reality with Force-feedback: Development of Desktop Virtual Space with Compact Master Manipulator," Computer Graphics, vol. 24, No. 4, 1990, pp. 165-170.
Su, S. Augustine et al., "The Virtual Panel Architecture; A 3D Gesture Framework," IEEE 1993.
Burdea, G. et al., "Distributed Virtual Force Feedback," 1993, pp. 25-44.
Kotoku, Tetsuo, "A Predictive Display with Force Feedback and its Application to Remote Manipulation System with Transmission Time Display," IEEE 1992, Jul. 7-10, 1992, pp. 239-246.
Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.
Schmult, Brian et al., "Application Areas for a Force-Feedback Joystick," ASME 1993, DSC-vol. 49, pp. 47-54.
Ellis, R.E. et al., "Design and Evaluation of a High-Performance Prototype Planar Haptic Interface," ASME Dec. 3, 1993, DSC-vol. 49, pp. 55-64.
Rosenberg, L. et al., "Commercially Viable Force Feedback Con-troller for Individuals with Neuromotor Disabilities," U.S. Air Force Final Report, Oct. 1995-May 1996.
(Author(s) Unknosn), "Virtual Presence Takes Surgeons Through the Virtual Keyhole to Hone Their Skills."
Kilpatrick, P., "The Use of a Kinesthetic Supplement in an Inter-active Graphics System," Univ. of N. Carolina, 1976, pp. 1-175.
Winey III, G., "Computer Simulated Visual and Tactile Feedback as an Aid to Manipulator and Vehicle Control," Mass. Inst. of Tech-nology, Jun. 1981.
Hirota, Koichi et al., "Development of Surface Display," IEEE 0-7803-1363-1, 1993, pp. 256-262.
Akamatsu, M. et al., "Multimodal Mouse: A Mouse-Type Device with Tactile and Force Display," Presence, vol. 3, No. 1, 1994, pp. 73-80.
Fisher, et al., "Virtual Environment Display Device," 1986.

* cited by examiner

Sphere
Parameters: r, radius

Bounding Box: +/- r
Contact: avatar point less than radius

Cone
Parameters: r, radius, h, height

Bounding Box: is same as Cylinder
Contact: perpendicular drop point between endpoints of centerline and perpendicular drop distance less than the cone radius at the centerline drop point.

Voxel
Parameters: array values

Bounding Box: array size

Cylinder
Parameters: r, radius, l, length

Bounding Box: +/- r, +/- r, +/-l/2
Contact: perpendicular drop to centerline less than r and drop point between endpoints of centerline

Box
Parameters: l, length, w, width, h, height

Bounding Box: +/- l/2, h/2, w/2
Contact: avatar within bounding limits

Polygonal Models
Parameters: vertex list, connectivity list

Bounding Box: maximum x, minimum x, maximum y, minimum y, maximum z, minimum z (plus sub-boxes and per-polygon boxes)

B-Spline Patch Models
Parameters: vertex list, connectivity list

Bounding Box: maximum x, minimum x, maximum y, minimum y, maximum z, minimum z (plus sub-boxes and per-polygon boxes)

FIG 4

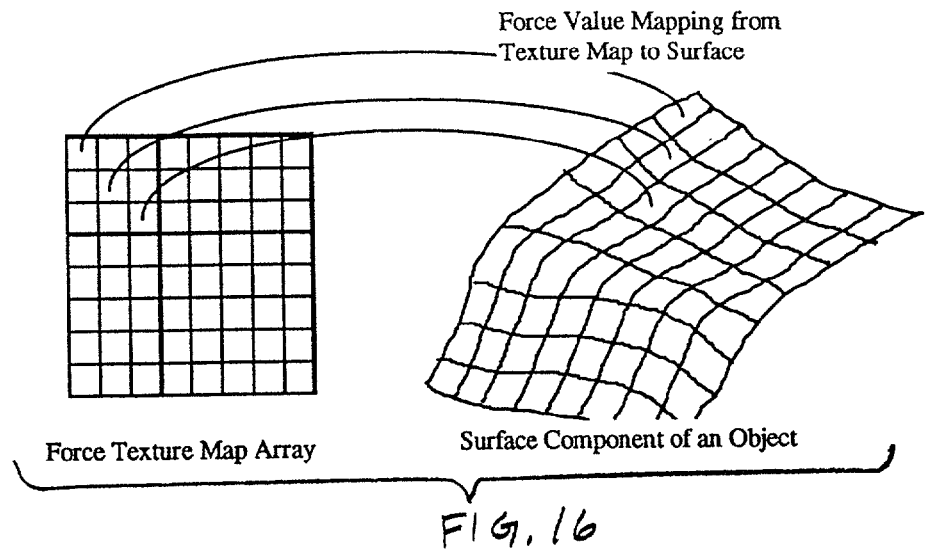

Force Value Mapping from Texture Map to Surface

Force Texture Map Array    Surface Component of an Object

FIG. 16

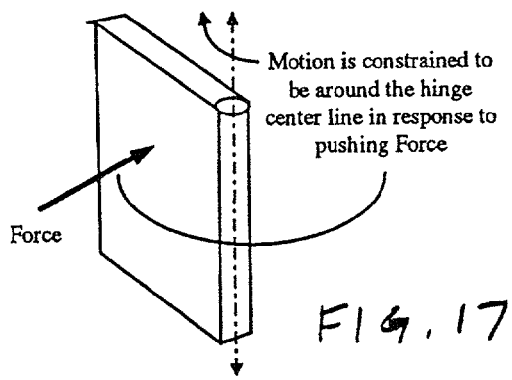

Motion is constrained to be around the hinge center line in response to pushing Force Force

FIG. 17

| Machine and Operating System Independence Foundation | Industry Standard Browser File Formats: VRML DXF IGES PDES |
|---|---|
| Configuration Files Defining Parameters and Geometry | |
| Operating System Dependent Library | |
| Machine Independent Coding Language | |

FIG. 18

HAPTIC AUTHORING

REFERENCE TO RELATED APPLICATION

This application is a Continuation of U.S. patent application Ser. No. 09/640,358, filed Aug. 16, 2000, now U.S. Pat. No. 6,374,255, which is a Continuation of U.S. patent application Ser. No. 08/859,877, filed May 21, 1997, now U.S. Pat. No. 6,131,097, and claims priority of U.S. Provisional Application Ser. No. 60/018,037, filed May 21, 1996, all of which are incorporated herein by reference.

FIELD OF THE INVENTION

This invention relates generally to force-feedback and haptic devices and, in particular, to the authoring of world models which incorporate haptic and visual integration.

BACKGROUND OF THE INVENTION

Specialized force-feedback devices originated in the 1960's with the introduction of teleoperations, wherein, typically, a smaller controller or master robot was moved by an operator to control the movements of a larger slave robot. Forces detected at the slave were then fed back to the operator through actuators at the location of the master. Such prior art is discussed in U.S. Pat. Nos. 5,389,865, 5,459,382 and 5,629,594 to Jacobus, et al, and also described elsewhere in the literature.

In the late 1980's, NASA funded several programs using force feedback devices which were not identically configured as miniature versions of a slave device. This advance enabled an operator such as an astronaut to control a number of different space-based robots and cranes from a "universal" controller. To realize this concept, the master controller was logically connected to the slave through a network of computers which were capable of translating the master kinematics typically into Cartesian coordinates and from Cartesian to slave kinematics (and back again).

With such computer translation in place on the master side of the system, it becomes possible to send inputs from the master, be it a joystick, wheel, yoke, or other type of manipulator, to a simulated slave rather than to a real one, and to accept forces from the simulation for application to the master as well. The simulation need not represent a real device, like a crane or robot, but may be a simulated vehicle, weapon-or other implement. The simulation may also reside in a person performing a task in a virtual world such as walking, handling objects, and touching surfaces. Such innovations are among those disclosed in the patents referenced above.

As force-feedback technology proliferates, haptic interfaces will need to accommodate numerous different controllers and environments. The issued patents referenced above disclose multi-degree of freedom controllers for use in various representative configurations, including totally self-contained configurations. At the same time, tools and techniques will need to be created to provide consistency in developing and improving haptic applications.

Toward these ends, co-pending U.S. application Ser. No. 08/859,157 provides means for adjusting behavioral attributes associated with haptic device control, whether during development or execution, and U.S. application Ser. No. 08/861,080, now U.S. Pat. No. 5,844,392 discloses architectures and features relating to "browsers," wherein common geometrical descriptions are shared among visual and haptic rendering functions. Both of these applications are incorporated herein in their entirety by reference. The need remains, however, for methods, data structures, and control strategies to organize the development of world models driven by these integrated haptic/visual environments.

SUMMARY OF THE INVENTION

The present invention resides in authoring tools which allow a user to create or import existing geometry files, attach haptic or other attributes to the object components of the files, and browse file contents in final or intermediate states of composition. The final edited world files may be written to disk or exported over networks, preferably in standardized formats, including hyperlinks over the world-wide web, to applications programs which incorporate visual, haptic, and/or sound capabilities, enabling other users view, touch, attached to, and manipulate the objects.

In a preferred embodiment, the invention incorporates a distinct set of facilities for reading, writing, browsing, navigating, and/or editing databases which encode hierarchical geometric data, so as to combine surface attribution and touch or haptic attribution. To enhance these functions, visual/haptic avatar may be provided to assist in designating a user's position in the virtual world being edited.

Applied forces may be used to aid a user in a number of ways, including the following:

moving a point to a particular discrete grid position (snap to grid);

moving to a geometrical object control point of feature (end points of a line, center of a circle, radius of a circle, control points of a b-spline, etc.);

to resist stretching or compression of a feature (i.e., programmable stiffness or elasticity);

to resist user actions (through viscosity, friction, repulsive force);

to help in aligning a new object with respect to an existing one (with or without knowledge of coordinate values needed for most equivalent operations); or to support material removal, as in carving or scraping operations.

Forces may also be used to demark the locations of menu items, dialog response locations, and icons (similar to use of forces to aid in locating control points or grid locations), or to maintain orientation or positional constraints while performing another operation.

The invention further supports the use of transform and object hierarchy for coding haptic world and object databases, as well as machine independent program description languages for haptic authoring system communications interfacing and control algorithms, independent of computer/operating system, control device type and communications systems.

BRIEF DESCRIPTION OF THE DRAWINGS

FIG. 4 illustrates primitive force generating objects and their descriptive parameters;

FIG. 16 is a force-texture map;

FIG. 17 illustrates a door-hinge motion constraint set; and

FIG. 18 is a diagram used to convey operating systems and computer systems independence.

DETAILED DESCRIPTION OF THE INVENTION

Figure 1:
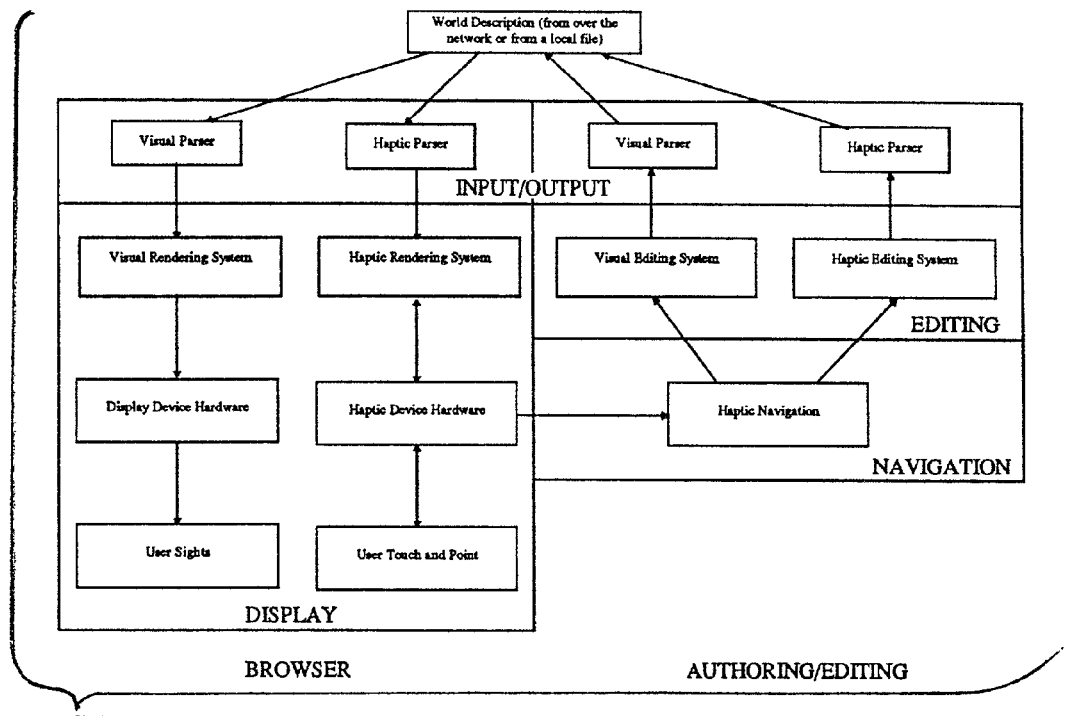
FIG. 1 presents basic elements associated with a haptic/visual authoring tool.

U.S. Pat. Nos. 5,459,382, 5,389,865 and 5,629,594 disclose devices and methods for providing users with a touch or tactile interface into a virtual world including virtual objects; that is, objects which are not real, but rather, are defined by a computer, model or simulation. The present invention builds on these teachings by facilitating tactical interaction with geometric objects described within a virtual world representation using a geometric probe logically attached to the haptic or tactile device (FIG. 1). This touch support representation is synchronized with a comparable representation of the world for visualization or graphical rendering, thereby enabling the world to be both seen and touched. Extending this analogy to nomenclature associated with visualization, the generation of forces from the act of touching virtual objects is referred to herein as haptic rendering, and the act of both touching and viewing the objects (or other data) is referred to as haptic browsing.

Figure 2:
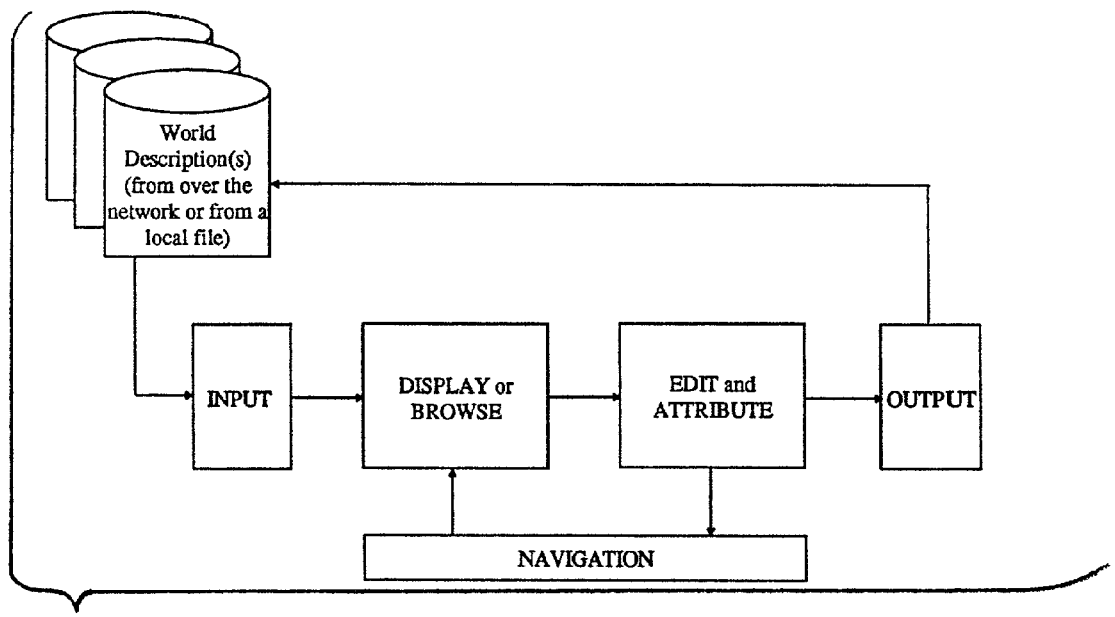
FIG. 2 is a flow-chart representation of a method of the invention.
Figure 3:
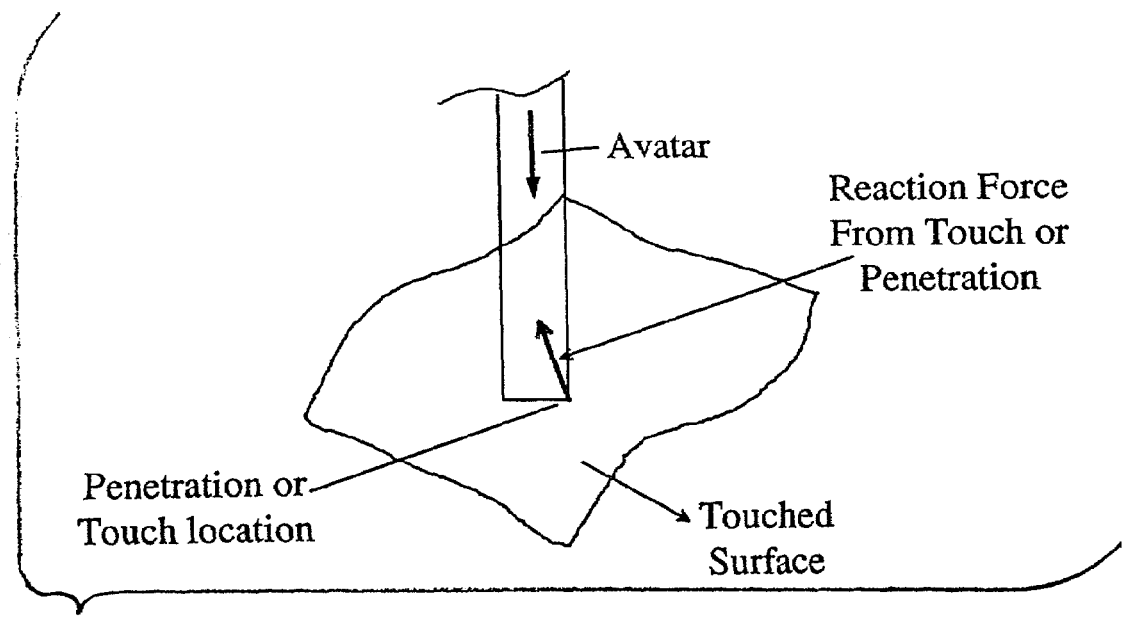
FIG. 3 is a diagram which shows an avatar interacting with a virtual object, generating responsive forces.

FIG. 2 presents the basic elements of a haptic/visual browser according to the invention, and FIG. 3 is a flow chart which represents an attendant method. In particular, FIG. 3 shows how a physical device may be connected through a control arrangement to a simulated or virtual environment. Position, velocity, and/or acceleration are measured at the controller (and therefore also from the user), and these values are sent to a computer controller bound to a virtual geometrical element or "probe." This probe, which may be alternatively referred herein as an "avatar," moves through the virtual environment, occasionally approaching or touching elements having mathematically described geometries within the environment.

When the avatar collides with a virtual object (FIG. 4), the collision event generates response forces, which, in turn, cause the controller to move to updated position, velocity, and acceleration states, thereby conveying the collision event to the user by providing a feeling for the objects associated with the collision. This process, referred to as haptic rendering, generates forces based upon geometric descriptions and touching point locations. Note, however, that an actual collision can be replaced by proximity, entry into/out of a field, such as magnetic or gravimetric, or entry into a new medium, such as from air to water. In addition, since avatar (and haptic device or controller) position, velocity, and acceleration states are made available to the virtual reality simulation, the avatar position and other simulated state changes can be stimulated through user motion and collision events.

Concurrently with maintaining avatar and static geometry data, the geometry data is preferably also used to generate three-dimensional, viewable imagery. Although conventional visual rendering is well known, unique to this invention, are processes associated with haptic rendering, including the way in which such rendering is synchronized with visual rendering so as to effect a multi-media (i.e., touch and sight) immersive virtual reality.

Figure 5:
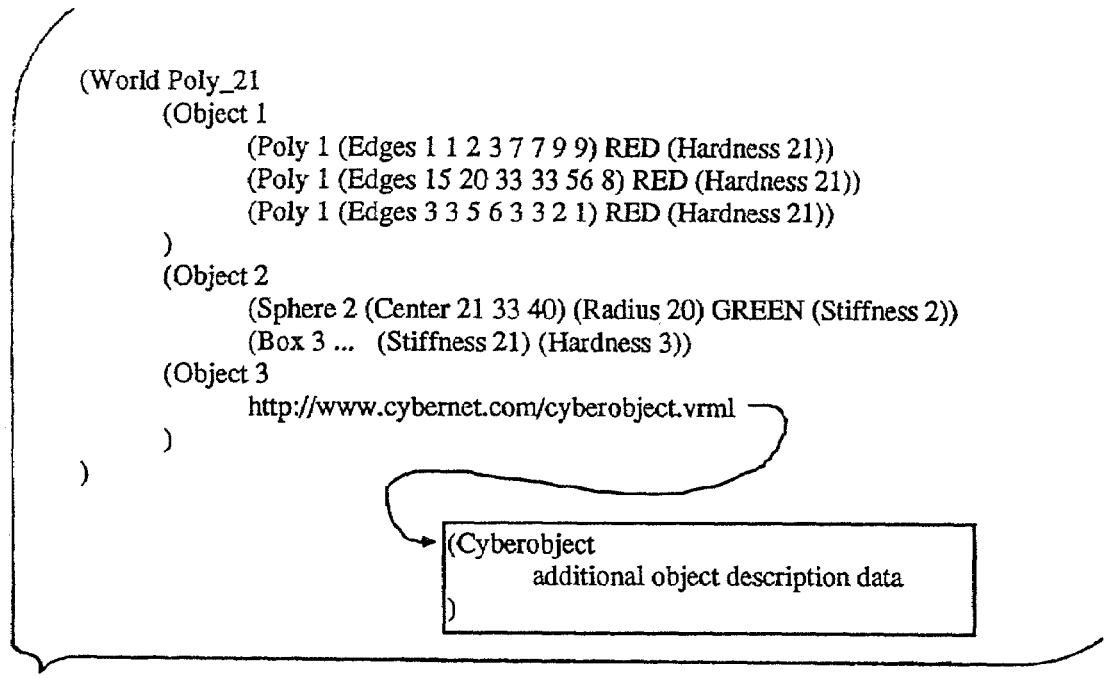
FIG. 5 illustrates haptic/visual browser object hierarchical description files.
Figure 6:
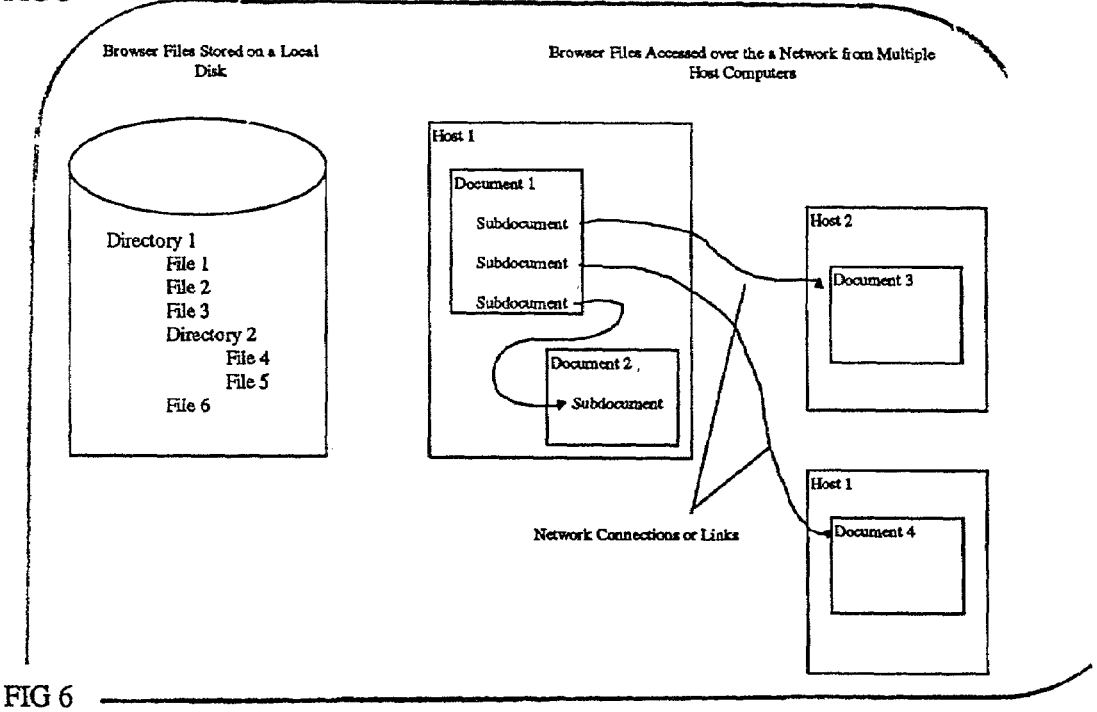
FIG. 6 shows where files for browsing may be located.

The concept of geometrical database browsing arises in part from the recognition that the geometric data which is loaded into the virtual world, thus initializing it, described as a hierarchy of objects may be described as statements or records in files (FIG. 5). As shown in FIG. 4, such data may represent simple objects, polygon arrays, and/or b-spline patches. As files, which may take the form of a collection or records or a single record, an object description can be read into memory for instantiation into the virtual world (by sending parsed forms of these records to the haptic rendering processing routines or the visual rendering processing routines), can be moved to different spots or named locations within the files system, or can be sent over a network (FIG. 6). Haptic/visual browsing is the function of reading the geometry description files from any source and causing them, under user direction, to be rendered visually in a haptic sense, and optionally, with sound generation or other characteristics as well.

The actual form of the geometrical database can be application-specific, as in the case of many CAD/CAM system databases, or can represent an industry standard such as DXF (the AutoCAD exchange format), IGES or PDES (industry standard graphics and product design formats), and/or VRML (a standard graphics format used to represent objects and object hierarchies for downloading and browsing over the Internet World Wide Web—typically in conjunction with HTML, the World Wide Wed Hypertext Mark-Up Language). Since the external file format is translated into a common internal form through format-specific translators, the methods described herein are format-independent, and include all representative forms.

This invention discloses methods associated with the creation of data structures and other elements which include haptic (i.e., relating to touch), visual and perhaps other information. As disclosed in co-pending U.S. application Ser. No. 08/861,080, a haptic browser will typically include a database reading/parsing function (FIG. 3), a geometry instantiation function for static and dynamic entities, a simulation core for creating behaviors of dynamic entities, a rendering function for visual, haptic, and possibly sound entities, and a user(s) interactions function which allows the user to move freely within the virtual environment being browsed and potentially attach to one or more dynamic entities in the world.

The database reading function can acquire information from files local to a particular computer, as would be typical in browsing a 3D CAD/CAM file, or may acquire the input from over a network such as the Internet. In any case, the file or data will be coded in a standard geometrical file format, including DXF (AutoCAD exchange format); IGES or PDES (industry standard CAD/CAM formats); or VRML version 1.0 or 2.0 (exchange formats for geometrical data supplied over the World Wide Web). The parsing portion of the reader converts the file format into specific data items needed to be instantiated, or to hand-off data describing geometrical elements to the haptic rendering system previously described, or a visual rendering system such as Microsoft Direct3D or OpenGL from Silicon Graphics.

FIG. 5 shows a conceptual graphics file format showing a hierarchical object description which might be used by such a browser. Attached to each item is a property list describing item visual and haptic characteristics. The haptic browser differs from a normal visual browser in the inclusion of the haptic characteristics in these object description files.

If the VRML format is used, one data item allowed in the data format is a hyperlink or URL (FIG. 5). The URL allows logical connection to another VRML or HTML file located on the same computer or another somewhere else over the Internet on the World Wide Web. In this way, traversal of VRML URLs (which are attached as properties of specific objects in the virtual world) can effect traversal from location on the World Wide Web to another (as well as providing entry points into HTML text documents as well).

FIG. 5 shows a conceptual graphics file format including a hierarchical object description. Attached to each item is a property list describing item visual and haptic characteristics. The haptic browser differs from a normal visual browser in the inclusion of the haptic characteristics in these object description files.

If the VRML format is used, one data item allowed in the data format is a hyperlink or URL (FIG. 5). The URL allows logical connection to another VRML or HTML file located on the same computer or another somewhere else over the Internet on the World Wide Web. In this way, traversal of VRML URLs, which are attached as properties of specific objects in the virtual world, can effect traversal from location on the World Wide Web to another, as well as providing entry points into HTML text documents.

Figure 7:
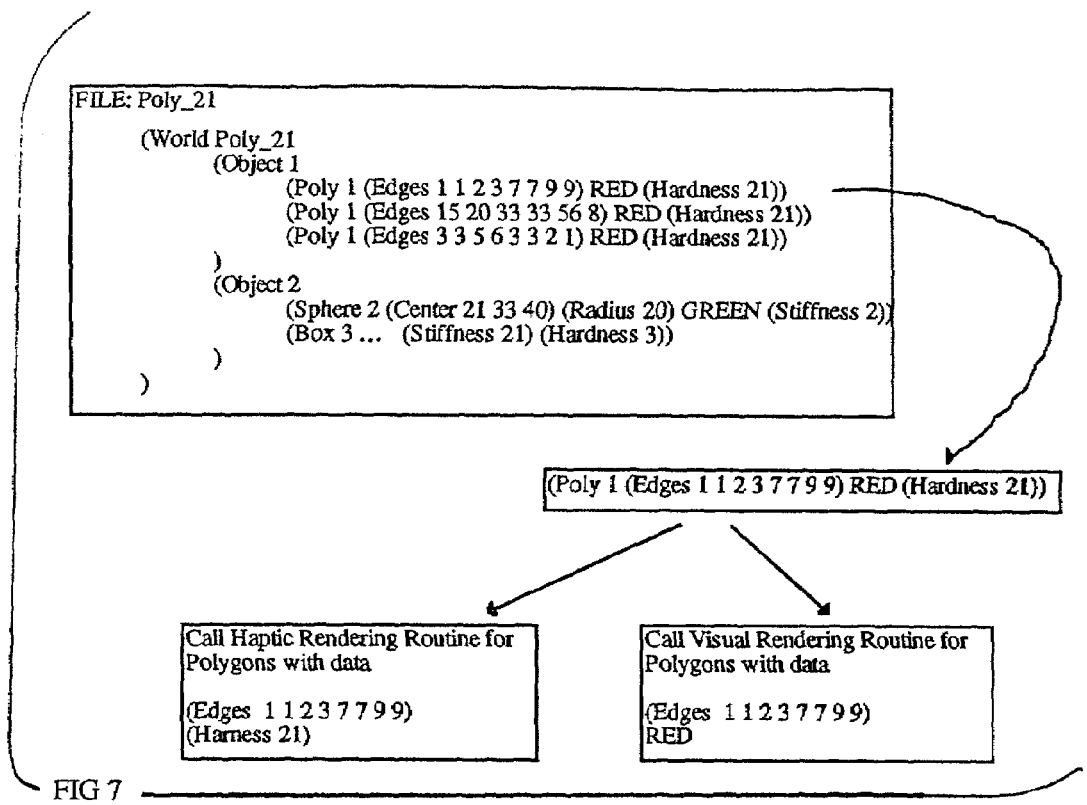
FIG. 7 is a diagram which depicts data flow from an input file to an API to a rendering engine.
Figure 8:
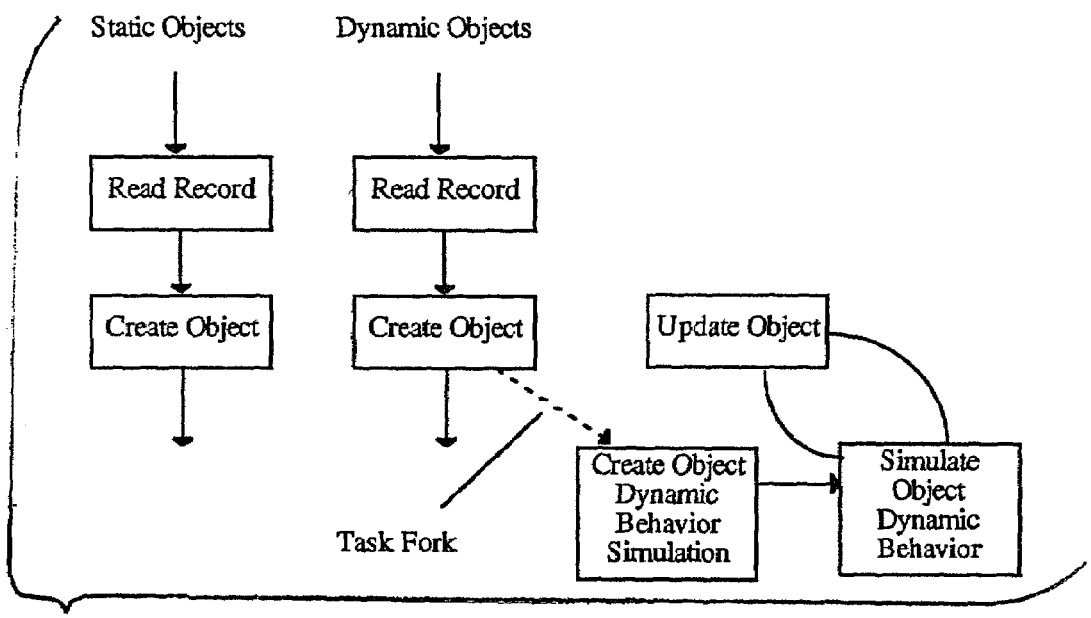
FIG. 8 illustrates static versus dynamic entity processing.

The geometric instantiation portion consists of a code segment which takes values supplied by the parser and makes the application programmer interface calls (API) necessary to create the geometrical entities within the rendering systems, both haptic and visual (FIG. 7). For static, or non-moving entities the calls can be made once for efficiency when a new virtual world segment is being created. However, for each dynamic entity, new calls are needed for every movement of change to be created (FIG. 8).

These changes to dynamic objects are signaled by external message packets from other simulations in a distributed simulation environment, by interaction with the user through the haptic interface device, or by internal simulation code in the simulation core. Motion of dynamic objects requires a simulation evaluation system similar to that originally disclosed in U.S. Pat. No. 5,459,382. However, the results include changes in dynamic object parameters, rather than haptic device output forces. These changes can be manifest at haptic device force outputs if the haptic device is attached to a particular changing dynamic object. Similarly, this attachment process can allow direct control of the attached virtual object through motion of the haptic input device itself.

Controls which provide direct computation of forces in accordance with the interaction of the device position point relative virtual surfaces, such as those described the U.S. Pat. No. 5,459,382, rely on computation algorithms capable of generating forces from planes and conic sections. Extensions to all forms of parametric surfaces, would be apparent to one of skill in the art of computer graphics, including voxel descriptions, arrays of polygons (which may be defined as several planes bounded by lines or edges), and point cloud representations (FIG. 4).

Figure 9:
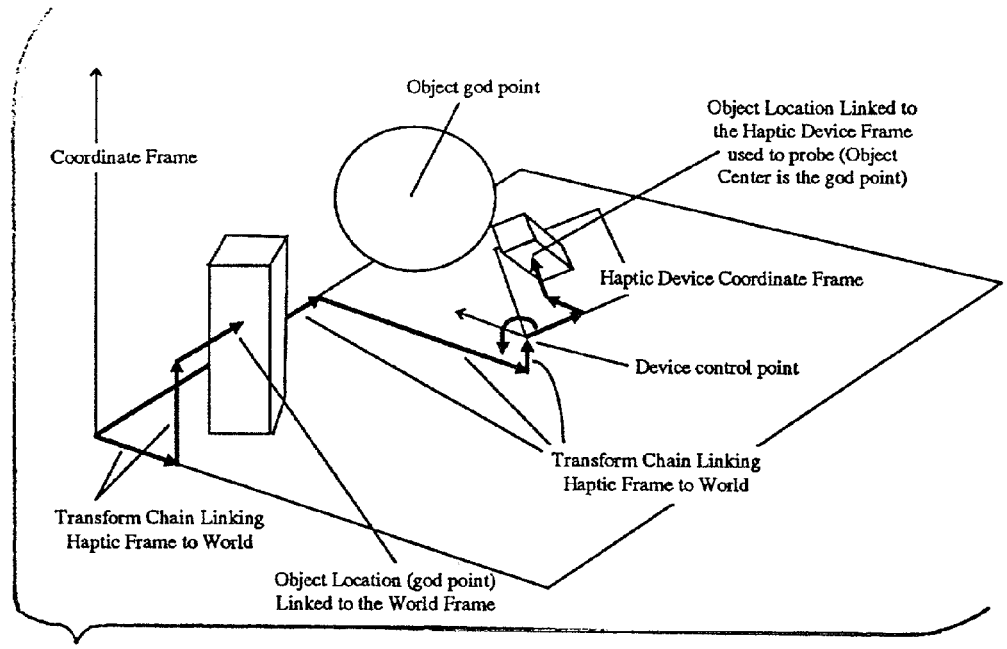
FIG. 9 is an oblique drawing used to illustrate fixed and movable objects, transform chains and coordinate point definitions.

A more detailed description of the way in which geometrical elements are represented in one embodiment may be expressed through the use of two main types of controls. The transform control (abbreviated XFM) computes the transformation matrix responsible for transforming one coordinate system to another. In this manner, a chain of such transforms can be assembled to specify the kinematics of a given haptic device (FIG. 9). The object control (abbreviated OBJ) contains information describing an object in the scene. If the object is placed by the composite device transform mentioned before, the object's position in the scene will be specified by the device orientation.

To create other objects in the scene, other transforms can be created that do not depend upon the device; that is, they may be fixed to a world coordinate space, as shown in FIG. 9. Other objects can also be created and positioned using these transforms. In this manner, a world of objects and their positioning transforms is created, with objects moving as dictated by the device, while other move of their own accord at constant velocity (dead reckoning). Other objects might not move at all, or may move because of an attachment to another moving object.

Often it is desirable to move the device without moving the controlled object, much like lifting the mouse when you have run out of mouse pad. Each transform has the capability to detach itself from its controlling axis so that it does not move with the device, but when it is reattached, it will move to the new position of this axis. To avoid this, the transformations can be based on position changes or deltas rather than positions. In this way, when the device is reattached, the transform will pick up where it left off when it was detached.

The simulation control (abbreviated SIM), monitors the objects in the world that are specified as avatars (moving objects), and determines if they are contacting any other objects in the scene. If so, contact forces are calculated and passed down the tree of transforms that position the avatar object (FIG. 9). Each of the transforms can then decide if it is attached to a device axis, in which case it would generate the appropriate force on that axis in accordance with haptic rendering.

Although all objects may be represented as polyhedrons, this is not the most efficient way to haptically render certain objects whose geometries are well defined and simple. To speed up the process of contact detection, a bounding box is placed around the object to more rapidly rule out distant objects. The defining parameters, as well as the contact detection method and the bounding box generation, is described below for a number of primitive objects. Some of these objects are shown in FIG. 4, along with indications as to relevant object description parameters.

Further elaboration of the haptic rendering process for each avatar may involve the following steps.

For each servo loop:

1. Compare the actual servo rate to the desired servo rate. Calculate the number of sub-loops that need to occur during the current servo loop in order to reach this desired rate. Using the beginning and ending axis data, compute the position deltas for each sub-loop.

In each sub-loop:

Update data for each object and transform.

For each avatar:

A. The position of the proposed god point gets assigned to be the avatar current location in absolute coordinates. The god point has no mass, so it will move all the way to the avatar if there are no obstacles.

For each object:

1. Check proposed god point against absolute bounding cube. Transform the proposed god point into the object's relative coordinate frame. Check against relative bounding box. If the current object is a polyhedron, check individual polygon bounding boxes.

2. If there is contact, separate deformable/non-deformable.

3. Non-Deformable: Construct a path from this object's god point to the current proposed god point. If this relative path crosses the object, remove the component of the path that is in the direction of the surface normal to get a new non-contacting path. Compute the new proposed god point as the object god point+non-contacting path. Store the surface normal so that other non-deformable contacts do not allow motion in this direction either. Alter motion of object and any objects connected to this one by springs. Transform proposed god point back to absolute coordinates.

4. Deformable: Construct a path from this object's god point to the avatar location. If the path crosses this object, remove the component of the path that is in the direction of the surface normal to get the path of the object god point. If there are other avatars touching this object, determine if the object god point for this avatar should be affected. If so, attract the object god point toward the other avatar. Deform the object based on vector from object god point to avatar. Alter motion of object and any objects connected to this one by springs. Transform proposed god point back to absolute coordinates.

5. After all objects have been checked for god point contact, move the god point to the modified proposed god point. Update all non-deformable contacted objects' object god points by transforming the final god point into each one's relative coordinate frame.

6. Loop through all contacted objects. Compute the penetration delta between the avatar and the object god point. Calculate smooth surface vector, if required, by polyhedron smoothing.

7. Refer to next object in list.

Figure 10:
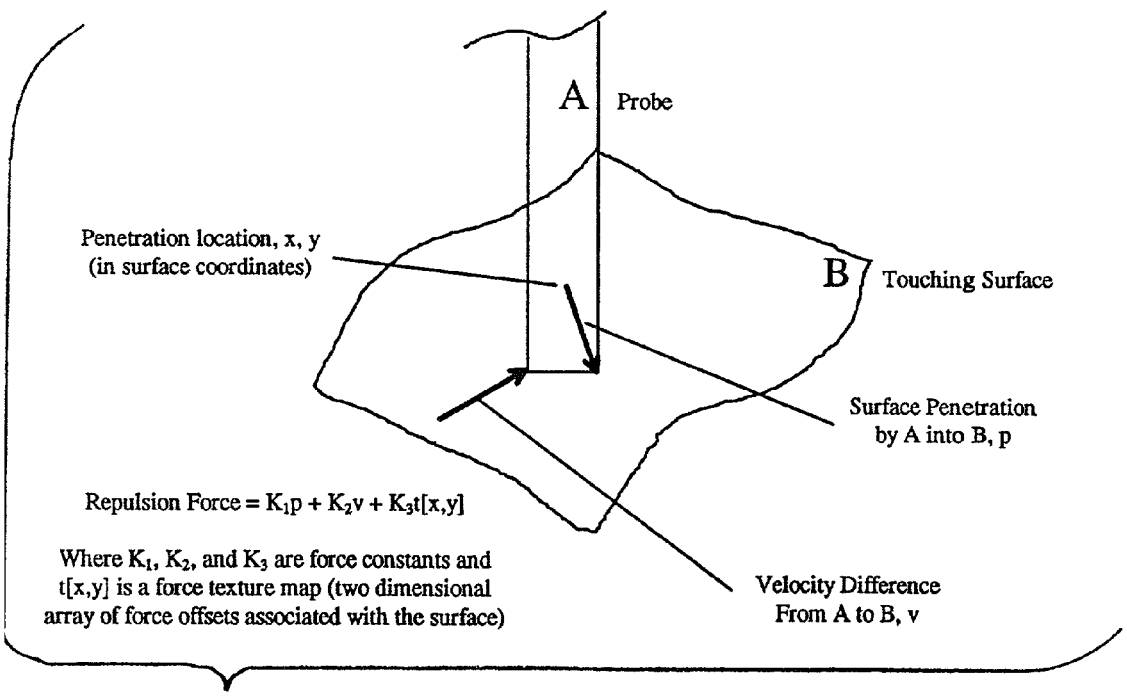
FIG. 10 illustrates force generation from object surface penetration.

B. Force between avatar and object god point will be determined by $K_1 p$ times the penetration delta and $K_2 v$ times the difference in their velocities. Add texture info to force vector (FIG. 10).

C. Repeat the procedure for the required number of sub-loops to complete the overall servo loop.

D. Apply the force at the avatar to the device.

One purpose of the haptic authoring tool is to create data structures such as that shown in FIG. 5, which may then viewed through the browser. Thus, the authoring tool according to this invention preferably includes browser functionality for display as a subset (FIGS. 1 and 2). In addition, the authoring tool includes read-in functions for additional graphics formats (for instance, DXF and IGES for an authoring tools which might extend primary support for VRML file reading and writing), direct user graphics editing facilities, and user interfaces for attaching attributes to specific portions or groupings of the geometrical data.

Attribute specifications (i.e. properties like color, stiffness, hardness, frictions, etc.) are specified in the authoring tool interface using attribute controls for haptics (and visuals) like those described in co-pending application Ser. No. 08/859,157. Geometrical object editing facilities may take advantage of interaction methods common in CAC/CAM systems and other graphics editors (like ProEngineer, BRL CAD, Alias/Wavefront, etc.) Attribution control or designation is similar to methods used for word modeling tools like Multigen, however are extended to support haptic attribute attachment (FIG. 7).

As shown in FIG. 2, there are four primary components to the inventive haptic authoring tool, which may be summarized as follows:

Input & Output—Reads and writes world descriptions with haptic attributes.

Display—Displays world in various ways to the user.

Navigation—Moves through the world.

Editing—Allows users to modify objects in the world, with an emphasis on haptic attributes.

In addition, developers may wish to mix haptic authoring according to this invention with other visual or sound authoring tools as part of a comprehensive world creation. Accordingly, although haptic authoring is optimized with respect to haptic content, in the preferred embodiment it also include native support for other modalities like sight or sound. As such, although this description focusses on haptic architectures, it should at all times be kept in mind that the invention is expandable to support fully functional world creation including visual, audible, and other attributes.

Haptic Authoring Input & Output

Haptic authoring according to this invention is preferably compatible with various world and object description formats, including open standards such as VRML. To accomodate proprietary world descriptions, the user may rely on a converter from the proprietary format to an open standard (typically available from within a proprietary authoring tool or CAD system). The world description file may already contain haptic attributes (such as stiffness or hardness). The haptic authoring tool writes out the world description file to the same open standard (such as VRML) as was read, however, it adds certain haptic attributes, as shown in FIGS. 5 and 7.

The following object description formats are currently anticipated for use in haptic authoring and/or browsing (FIG. 4):

Sphere

Box

Cylinder

Cone

Polygonal Model

NURBS (and other related parametric spline representation)

Voxel (and other related volume representations)

For object and scene representations not specified, the system preferably performs a conversion to a supported representation that most closely approximates the unsupported format items.

Figure 11:
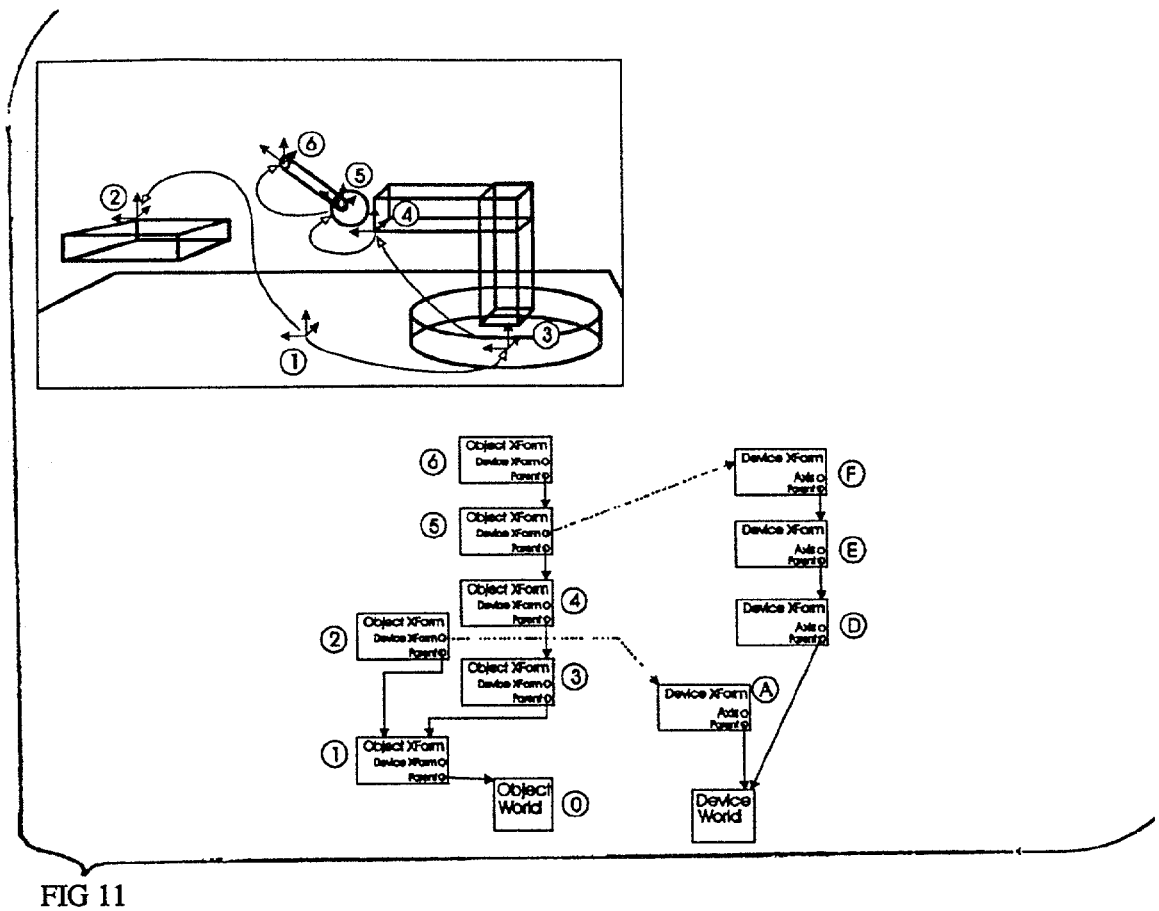
FIG. 11 depicts a transform and object hierarchy for a typical haptic device.

Scene hierarchies are also an essential component of scene descriptions, and are also essential to haptic browsing and authoring. These are also preferably supported by the haptic authoring tool (FIGS. 5, 7, and 11). In keeping with the open standards of the industry, a standard parser is suggested so that developers can easily read and write haptic syntax format.

Haptic Authoring Display or Haptic Browser

The visual display of the authoring tool provides the basic functionality found in many other similar authoring tools. Various visual rendering modes such as wireframe, shaded polygons, and texture mapping, are implemented. If the developer does not have access to a force-feedback development device, visual cues may be provided to represent the haptic attributes of object in the scene.

In addition to an end-user display, a hierarchical representation is preferably displayed and presented to the author as well, as shown in FIG. 11. This may take the form of a list or tree-like structure that represents the scene description, and gives the author a precise method of manipulating all elements in the scene. This hierarchical structure, which may reside in memory, on a network, or in a file, is converted from a storage format to appropriate calls to the visual and haptic applications developer interface (API), and then rendered as indicated previously and in U.S. application Ser. No. 08/861.080.

Haptic Authoring Navigation

Figure 12:
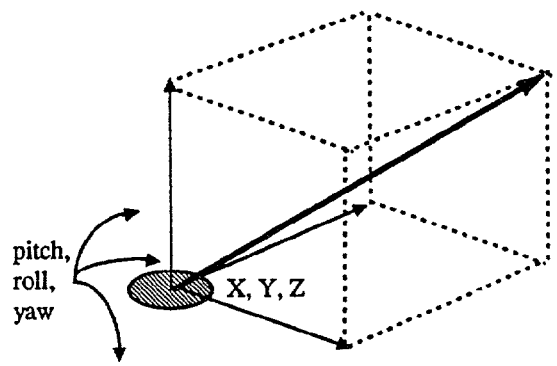
FIG. 12 illustrates flying in six degrees of freedom.
Figure 13:
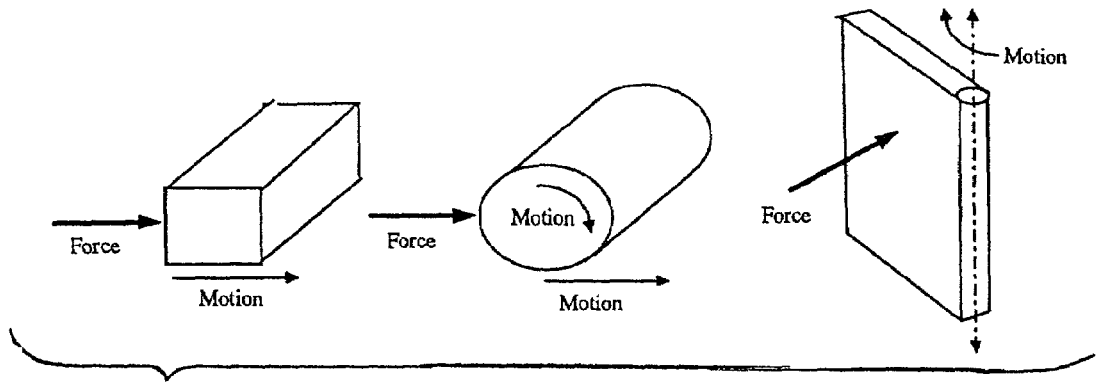
FIG. 13 shows pushing, rolling, and opening as examples of force-based tasks.

A developer using a force-feedback device during haptic authoring can navigate through a scene with sight and touch much as the end user of a haptic browser. As in visual navigation, modes such as walk and fly are preferably made, available with respect to a standard 2 degree-of-freedom tracking device such as a mouse. Greater degrees of freedom offer additional metaphors for moving throughout a scene, however. For instance, flying can include motion in at least six distinct degrees of freedom, X, Y, Z, and pitch, roll, and yaw, as shown in FIG. 12. As shown in FIGS. 10 and 13, haptic touch of specific objects in the world can also activate response forces and can accomplish pushing, rolling, or opening tasks.

Haptic Authoring Editing

Central to haptic authoring is editing, which provides the ability to choose objects and individual surfaces of objects. Once selected, various haptic attributes of the object may be set as described in the next section. Attributes editing may be as simple as modifying a text entry of a number or as complex as the attribute setting capabilities described in U.S. application Ser. No. 08/859,157, which discloses the use of physical or graphics sliders, knobs, or other value generating graphical user interface (GUI) elements.

Figure 14:
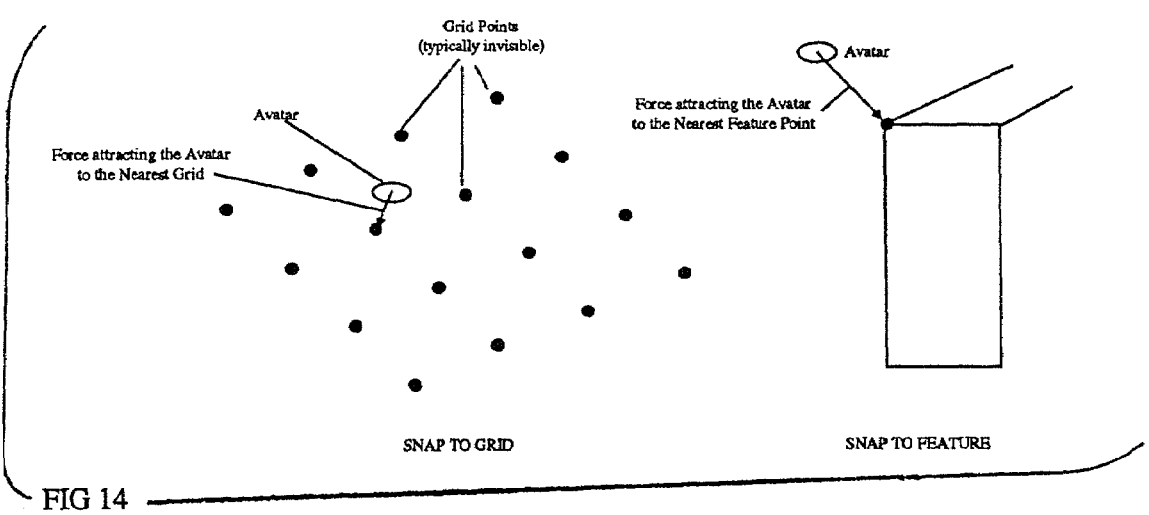
FIG. 14 shows how an avatar may be moved so as to snap to a grid or feature point.

Haptic authoring according to this invention also preferably provides the capability to create, modify, and delete objects. As mentioned above, when using a force-feedback device, interesting new force-feedback cues may be used to aid the developer in manipulating and modifying the scene and objects. Some representative haptic cues include:

1. The use of forces to aid the user in moving a point to a particular discrete grid position (literally, 'snap' to grid—see FIG. 14).

2. The use of forces to aid the user in moving to a geometrical object control point of feature (end points of a line, center of a circle, radius of a circle, control points of a b-spline, etc).

3. The use of forces to resist stretching or compression of a feature (i.e. programmable stiffness or elasticity)—this would typically be implemented by a resistance to move a feature control point.

4. The use of forces (viscosity, friction, repulsive force) to resist the action of material addition (adding a new object over an old one with force resisting at the point of contact. This makes it easy to align the objects along a mutual boundary or side without knowledge of coordinate values needed for most equivalent operations using conventional CAD systems) or material removal (resistance to separation of two objects, or even depictions of carving or scraping operations to remove virtual material from virtual objects which would be analogical to physical removal of material from physical objects).

5. The use of forces to demark the locations of menu items, dialog response locations, and icons (similar to use of forces to aid in locating control points or grid locations).

Figure 15:
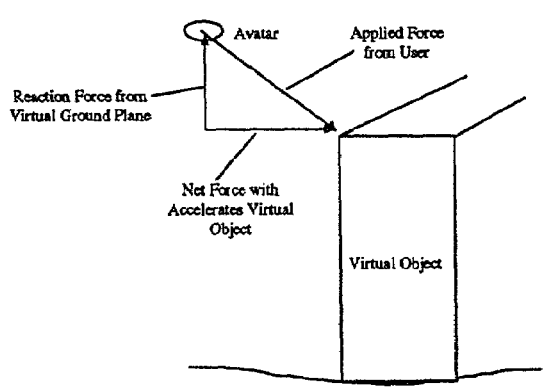
FIG. 15 illustrates how alignment may be maintained during motion according to the invention.

6. The use of force to maintain orientation or positional constraints while performing another operation (for instance, if one were to move a virtual building, one might want to have the orientation, up, left, right to be maintained according to the gravity vector and the orientation of a city block structure; that is, X and Y would not be constrained but Z would be constrained by ground contacts—see FIG. 15).

While the haptic author may individually set each attribute listed below, an important aspect of the editing process includes the selection from a pre-existing library of previously created groupings of attributes and their values. For example, a 'hardwood surface' may have a specific texture attribute (forces defined in an array located relative to a surface coordinate system—see FIG. 16) combined with a specific elasticity setting and a static/dynamic friction values. The authoring tool allows the author to create these groupings of settings, save them, and use previously created groupings.

In addition, higher level kinematic simulation models such as "hinge," which is a set of relationships that describe the motion and feel of a hinge as used on doors (FIG. 17), may be inserted by the author, with the authoring tool linking the author's control function parameters to the attribute setting mechanisms already included. This complex building of an object from simpler elements represents an object oriented construction method, and allows complexity encapsulation while supporting complex combinations.

Summary of Important Haptic Attributes

Haptic attributes specify the characteristics of an object that are 'displayed' or rendered by the force-feedback device, much as the color attribute is used to specify how the object is displayed visually. It is important to note that these haptic attributes are specified in a platform-independent manner (for any potential haptic device configuration), focusing on the essential concepts of the haptic interaction. The actual interpretation and implementation of these forces are determined by the specific platform and device capabilities.

The following haptic attributes represent a wide variety of physical interactions that a force-feedback device can render to a user. However, as will be apparent to one of skill, the concept of a haptic attribute and the way in which it attaches to object geometry generalizes to attributes not explicitly discussed herein. Not also that the attributes are specified at a high level, hiding the issues of low-level force-feedback control theory already described in U.S. Pat. Nos. 5,459,382, 5,389,865 and 5,629,594 using names and parameters that are intuitive to the developer. All attributes are attached to objects, though a particular object need not be visible from a particular haptic or visual view point, in order to exist in the world database and allow for the attachment of haptic attributes.

Currently there are at least five categories of attributes. Certainly this list of attributes will increase as more capabilities are added to specific scene description languages.

Interior Attributes—that describe forces once the user's avatar (the avatar is an object attached to the position specified by the haptic interface device's end point—i.e. is in some sense the user's persona in the virtual world) is inside a object (such as viscosity).

Surface Attributes—that describe force for when the user is in contact with the surface of a object (such as hardness).

Charge Attributes—that describe repulsive and attractive forces that may cover an area around the object (such as gravity).

Physical Attributes—attributes such as mass and its specific location in an object.

Constraint Attributes—attributes such as connection to other objects, and restricted area of motion.

Interior (Volume) Specifications

Viscosity—provides a sluggishness, such as various types of liquid.

Force/Torque—A constant vector of force/torque within the objects frame of reference.

Vibration—A periodic force that is parameterized (amplitude, frequency, etc.)

Effects—A playback of a force sample.

Surface (Geometric) Specifications

Elasticity—Resistance to penetration by Haptool

Deformation—Ability of a surface to retain its shape from penetration by Haptool Adhesiveness—Attraction of surface to Haptool when in contact.

Static Friction—Resistance to initial lateral movement when Haptool is in contact with object.

Dynamic Friction—Resistance to continued lateral movement when Haptool is in contact with object.

Thickness—Determines internal and surface regions for Haptool penetration.

1 dimensional Omni-directionalTexture—provides feels such as 'gritty' across an entire object, independent of the users direction of movement.

1 dimensional Uni-directional Texture—same as above except dependent of users direction of movement across surface of object, such as a 'ridges'.

2 dimensional Surface Texture—similar to texture mapping in 3D graphics, provides complete control over surface feels.

Charge Specifications

Charge Type—User defined type

Charge Position—Vector specifying location within objects frame-of-reference of the charge.

Charge Value—Actual magnitude of charge, including sign.

Charge Scalar—Scalar component of equation defining the force generated between 2 charges of the same type.

Charge Exponent—Exponential component of equation defining the force generated between 2 charges of the same type.

Physical Specifications

Mass Value—Point-mass magnitude.

Mass Offset—Vector specifying location of point mass within objects frame-of-reference.

Inertial Tensor

Constraint Specifications

Spring—Classic Spring-and-Damper representation.

Attachment—Type and its specification. Point, Line, or Plane.

Haptic Authoring—Avatar Specification

The avatar represents a user(s) in the virtual three dimensional space. The simplest implementations use the keyboard and mouse to directly navigate through the three dimensional space, with no explicit avatar representation. Alternatively, the user attaches to an iconic object which is moved through interaction with the haptic device. This iconic object is the avatar.

The user's avatar may take a variety of representations in the virtual space. It may be something as complex as a model of a car or human, or as simple as a hand or a wand. Regardless of the object, the object has a defined set of allowed motions that the user uses to navigate and interact with the world and object in it.

In addition to the avatar, the user has a variety of input devices to control the avatar and to control non-avatar interactions(such as menus, buttons, etc.). These input devices subset to mouse and keyboard, and include more complicated conventional input devices (touch pads, digitizers, light pen, etc.). Furthermore, the user use a force-feedback or haptic device, which allows for output through the device to also be displayed to the user through touch or pressure.

Transform Hierarchy

One important purpose of haptic authoring is to enable an author to define the mapping between the avatar and the control device for both input and output. At the core of this mapping is a concept used in three-dimensional scene descriptions, namely, the hierarchy of matrix transforms which translate and rotate components or objects from the fixed ground plane coordinate system. Once the user has specified this mapping, the avatar pointing/position output will be in the standard virtual world coordinates and thus will map to location fields contained in object description formats.

By representing both the avatar and a device as a hierarchy of matrix transforms, a mapping or associations of transforms from one to the other is possible. FIG. 11 shows an example object and a control device, their hierarchical transforms, and the association between them.

The haptic authoring tool presents the user with the transform hierarchy of a object and a device to intuitively allow for the specification of associations through a point-and-click type interface.

For each transformation in the hierarchy of transforms, there are a set of attributes that the user may specify. First, consider haptic device transforms. Each transform is associated with, at most, a single axis(1 degree of freedom) of a device. However, multiple transforms maybe attached to the same axis. These attributes determine how the input/output of each axis of the device determines the associated transforms matrix.

The following attributes are defined for each device transform:

Parent—Parent transformation.

Axis #—the physical axis that the transform is associated with for input and output.

Control Type—1 of three types position, velocity, or acceleration.

Degree of Freedom—The degree-of-freedom in Cartesian space x,y,z,rotx,roty,rotz that is associated to the Axis#

Low thresh—low thresh for control type, raw positions

High thresh—high thresh for control type position scaling k—linear scaling term for raw position read in.

position scaling e—exponential scaling term for raw position read in.

force scaling k—linear scaling term for force sent out.

force scaling e—exponential scaling term for force sent out.

In terms of object transform attributes, each object may be connected to the world coordinate system through a transform chain with the following attributes;

Parent—parent transformation.

Mode—indicates which matrix of the object transformation is modified: delta, relative, or absolute (delta is when the object is an offset from the prior position, relative is when the transform is expressed relative to its parent, and absolute is when the transform is expressed absolute).

Additional Issues in Haptic Authoring Architecture

Each haptic browser file produced by the authoring tool can stand alone or can include URL links which provide for the inclusion of entire haptic browser files from the same, or other, locations over a network like the World Wide Web. These URLs are links to potentially complete subworlds or objects and can be made from within the authoring tool (with view verification through the authoring systems' slave browser) The browser file can include dynamic objects with attached simulation or behavior descriptions (as in VRML 2.0), or as in VRML 1.0 can be totally static. The visual rendering of object components if performed in the conventional manner by visual rendering systems such as those included in Direct3D or OpenGL. However, the haptic rending component is accomplished using the data structures, methods, and procedures described herein.

Operating system and computer independence may be achieved through several methods, as shown in FIG. 18. First is use of a language for coding software which is available on each computer architecture supported, namely C and C++. Tuning to the specific machine of algorithms may be accommodated through configuration files which define constants, pre-computed forces and force sequences, and device geometry/characteristics. Operating system functions which differ, or are not built-in, may be coded separately. The graphics/haptics browser file formats can and, for the most part, are, defined for manipulation by any computer type. File format definitions for VRML, DXF, IGES, and PDES are defined in a standard way across industry users. These policies allow for platform independent operations of the force feedback system.

We claim:

1. A method, comprising:
   causing a display of a graphical object in a graphical environment;
   sensing a location of an avatar in the graphical environment; and
   outputting a haptic sensation when the avatar contacts the graphical object.

2. The method of claim 1 further comprising correlating the location of the avatar with a position of a user-manipulable graphical object.

3. The method of claim 2 further comprising outputting the haptic sensation to the user-manipulable graphical object.

4. The method of claim 1 wherein the graphical object includes a surface, and wherein the avatar operates to deform the surface.

5. The method of claim 4 wherein the haptic sensation includes one of a resistive force and an elastic force.

6. A processor-executable program, stored on a computer-readable medium, comprising:
   code to cause a display of a graphical object in a graphical environment;
   code to sense a location of an avatar in the graphical environment; and
   code to output a haptic sensation when the avatar contacts the graphical object.

7. The processor-executable program of claim 6 further comprising code to correlate the location of the avatar with a position of a user-manipulable graphical object.

8. The processor-executable program of claim 7 further comprising code to output the haptic feedback to the user-manipulable graphical object.

9. The processor-executable program of claim 6 wherein the graphical object includes a surface, and wherein the avatar is operable to deform the surface.

10. The processor-executable program of claim 6 wherein the haptic feedback includes one of a resistive force and an elastic force.

11. A The computer-readable medium on which is encoded computer program code comprising:
   program code for causing a graphical object to be displayed in a graphical environment;
   program code for receiving a haptic attribute to be associated with the graphical object;
   program code for associating the haptic attribute with the graphical object; and
   program code for storing the associated haptic attribute and the graphical object in a computer-readable medium, wherein the graphical object includes a surface, and wherein an avatar is operable to deform the surface.

* * * * *

UNITED STATES PATENT AND TRADEMARK OFFICE
CERTIFICATE OF CORRECTION

| | | |
|---|---|---|
| PATENT NO. | : 7,191,191 B2 | Page 1 of 1 |
| APPLICATION NO. | : 10/122090 | |
| DATED | : March 13, 2007 | |
| INVENTOR(S) | : Thomas Peurach, Douglas Haanpaa and Todd Yocum | |

It is certified that error appears in the above-identified patent and that said Letters Patent is hereby corrected as shown below:

Column 2, Line 18 the phrase "enabling other users view, touch, attached to and manipulate the objects." should read--enabling other users to view, touch, attach to, and manipulate the objects.--

Column 4 Line 39, the word "Wed" should read--Web--

Column 5 Line 52, delete the word "be"

Column 5 Line 60, the word "the" should read--in--

Column 7 Line 55, the word "graphics" should read--graphic--

Column 7 Line 56, delete the word "an"

Column 10 Line 62, the word "a" should read--an--

Column 12 Line 32, the word "a" should read--an--

Column 14, Claim 11, the phrase "a the computer-readable medium" should read--A computer-readable medium--

Signed and Sealed this

Twenty-sixth Day of June, 2007

JON W. DUDAS
*Director of the United States Patent and Trademark Office*